(12) United States Patent
Bischof

(10) Patent No.: US 9,986,398 B2
(45) Date of Patent: May 29, 2018

(54) RADIO RECEIVING DEVICE

(71) Applicant: AUDI AG, Ingolstadt (DE)

(72) Inventor: Klaus Bischof, Hilpoltstein (DE)

(73) Assignee: AUDI AG, Ingolstadt (DE)

( * ) Notice: Subject to any disclaimer, the term of this patent is extended or adjusted under 35 U.S.C. 154(b) by 0 days. days.

(21) Appl. No.: 14/903,941

(22) PCT Filed: Jun. 20, 2014

(86) PCT No.: PCT/EP2014/001675
§ 371 (c)(1),
(2) Date: Jan. 8, 2016

(87) PCT Pub. No.: WO2015/003774
PCT Pub. Date: Jan. 15, 2015

(65) Prior Publication Data
US 2016/0174052 A1    Jun. 16, 2016

(30) Foreign Application Priority Data

Jul. 10, 2013    (DE) .................. 10 2013 011 529

(51) Int. Cl.
*H04W 4/18* (2009.01)
*H04H 20/22* (2008.01)
*H04B 7/04* (2017.01)

(52) U.S. Cl.
CPC ............... *H04W 4/18* (2013.01); *H04B 7/04* (2013.01); *H04H 20/22* (2013.01); *H04H 2201/60* (2013.01)

(58) Field of Classification Search
CPC ............ H04W 4/18; H04B 7/04; H04H 20/22
See application file for complete search history.

(56) References Cited

U.S. PATENT DOCUMENTS 5,592,471 A *  1/1997  Briskman ............... H04B 7/06
                                                   370/320
5,617,467 A *  4/1997  Bacher ................ H04W 88/08
                                                   370/496

(Continued)

FOREIGN PATENT DOCUMENTS

CN        101138167 A      3/2008
DE    11 2009 001362 T5    5/2011

(Continued)

OTHER PUBLICATIONS

International Search Report and Written Opinion for Application No. PCT/EP2014/001675 dated Aug. 6, 2014.

(Continued)

*Primary Examiner* — Rasheed Gidado
(74) *Attorney, Agent, or Firm* — Alston & Bird LLP

(57) ABSTRACT

The invention relates to a method for operating a radio receiving device, which receives and outputs a radio signal which transmits a radio station signal of a selected radio station. The method comprises
  acquiring radio channels which transmit the radio station signal of the selected radio station by means of a separate radio channel-specific radio signal in each case,
  ascertaining radio channel-specific parameters of the acquired radio channels,
  generating radio channel-specific radio station signals by processing the radio signals of the radio channels in consideration of the respective radio channel-specific parameters,
  standardizing the generated radio channel-specific radio station signals,
  superimposing the standardized radio channel-specific radio station signals to form a reception radio station signal, and
  outputting the reception radio station signal.

6 Claims, 6 Drawing Sheets

(56) References Cited

U.S. PATENT DOCUMENTS

Figure 1:
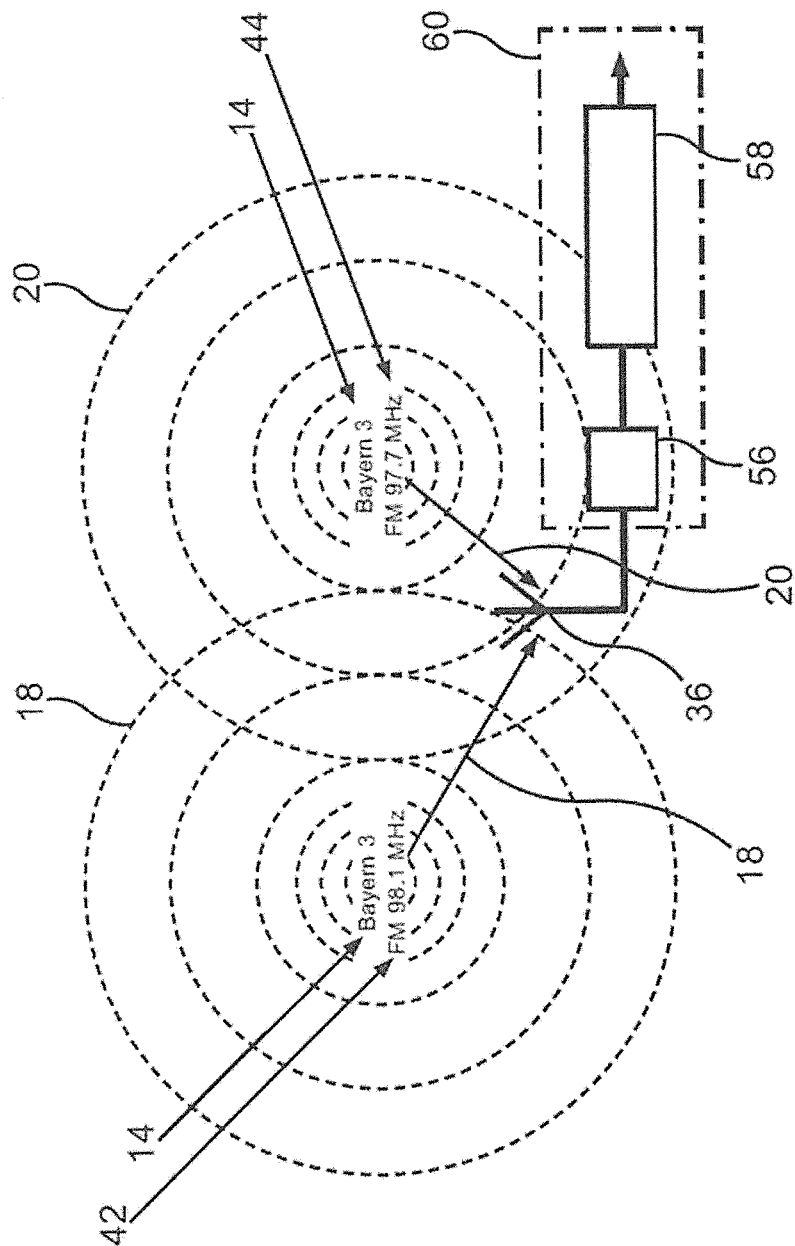

| | | | |
|---|---|---|---|
| 6,549,774 B1 | 4/2003 | Titlebaum et al. | |
| 7,720,172 B2* | 5/2010 | Nakagawa | H04L 25/0204 |
| | | | 375/260 |
| 2002/0115418 A1* | 8/2002 | Wildhagen | H04H 20/22 |
| | | | 455/133 |
| 2006/0111903 A1* | 5/2006 | Kemmochi | G10H 1/0091 |
| | | | 704/244 |
| 2006/0160495 A1* | 7/2006 | Strong | H04B 7/04 |
| | | | 455/101 |
| 2009/0298453 A1 | 12/2009 | Elenes | |
| 2011/0063130 A1* | 3/2011 | Ozaki | G07C 5/008 |
| | | | 340/905 |
| 2013/0044840 A1* | 2/2013 | Yamamoto | H04H 20/22 |
| | | | 375/340 |
| 2014/0120958 A1* | 5/2014 | Nitta | H04W 64/00 |
| | | | 455/457 |

FOREIGN PATENT DOCUMENTS

| | | |
|---|---|---|
| EP | 0 967 746 A2 | 12/1999 |
| EP | 1 233 556 A1 | 8/2002 |
| JP | 2006 270249 A | 10/2006 |
| JP | 2007 158492 A | 6/2007 |

OTHER PUBLICATIONS

International Preliminary Report on Patentability (Chapter II) for Application No. PCT/EP2014/001675 dated Jan. 14, 2016.
Examination for German Application No. 10 2013 011 529.9 dated Mar. 12, 2014.
Office Action for corresponding Chinese patent application No. 201480039246.8 dated Nov. 3, 2017, with English translation, 16 pages.

* cited by examiner

RADIO RECEIVING DEVICE

CROSS REFERENCE TO RELATED APPLICATIONS

This application is a national stage 371 application of International Application No. PCT/EP2014/001675 filed Jun. 20, 2014, which claims priority to and the benefit of German Application No. 102013011529.9, filed Jul. 10, 2013, the entire contents of which are hereby incorporated by reference.

The present invention relates to a radio receiving device and a method for operating a radio receiving device.

Radio receiving devices are known in a variety of embodiments in the prior art, so that separate printed evidence thereof is not required for this purpose. Radio receiving devices are used to receive a radio signal, which is emitted unidirectionally from a radio transmitter, to obtain items of information therefrom, which are output to a user of the radio receiving device. The items of information are provided by a radio station by means of a radio station signal, which is emitted from the radio transmitter by means of the radio signal. Radio transmission is therefore a unidirectional transmission of information from the radio station to the radio receiver. Information transmission in the reverse direction is typically not possible in the case of radio transmission. Typically but not exclusively, radio transmission is used for transmitting information in the form of video or audio, that is to say, of television or radio.

In particular in the case of mobile audio reception by means of an audio radio receiver, also colloquially referred to as a "radio", but sometimes also in the case of stationary reception, the problem occurs that a radio station selected by the user can only be received poorly on a set transmission frequency. The user then attempts to improve the reception by tuning the radio receiver to another frequency on which the radio station is transmitting. Modern radio receivers, in particular automobile radios, additionally have an automatic switchover capability, in which the audio radio receiver is automatically switched over from a first radio channel to a second radio channel, which both emit the same radio station signal.

In particular in the mobile field, it has proven to be disadvantageous that the reception can frequently be interfered with, even while using the automatic switchover. Even special technologies with respect to a "soft" switchover cannot entirely prevent interference, in particular during movement of the radio receiving device. In addition, frequently switching over, in particular during movement of the radio receiving device, can itself trigger reception interference.

It is therefore the object of the invention to provide a method for operating a radio receiving device as well as a radio receiving device, which enables an improvement of the reception of a radio station signal from a radio station.

With respect to the method, the invention proposes as a solution a method for operating a radio receiving device, which receives and outputs a radio signal which is transmitting a radio station signal of a selected radio station, wherein the method comprises the following steps:

acquiring radio channels which transmit the radio station signal of the selected radio station by means of a separate radio channel-specific radio signal in each case, ascertaining radio channel-specific parameters of the acquired radio channels, generating radio channel-specific radio station signals by processing the radio signals of the radio channels in consideration of the respective radio channel-specific parameters, standardizing the generated radio channel-specific radio station signals, superimposing the standardized radio channel-specific radio station signals to form a reception radio station signal, outputting the reception radio station signal.

Radio transmission refers to unidirectional communication between communication partners, in this case a radio station and a radio receiving device, wherein the communication is exclusively possible from one communication partner to the other communication partner. Of course, the radio station can also use more than one radio transmitter to emit its radio station signal by means of radio signals of the radio transmitters. The radio signal or signals can be received by at least one radio receiving device. Radio is generally wireless and is distinguished in that electromagnetic waves are frequently used as the medium for the radio signals.

A radio channel is a unidirectional communication channel, in which a range for the radio signals is defined by narrow frequency ranges, in each of which a single radio signal is emitted. The range is generally selected so that the radio signal is essentially not interfered with by radio signals of adjacent radio channels. In addition, of course, a radio channel can also be a repeating, specific time slot in a frequency band, in which a single radio station signal is emitted. Each radio transmitter can use at least one, but often also multiple radio channels. The assignment of radio channels to multiple radio receiving devices is typically performed such that the radio signals, which are emitted from the radio stations, of adjacent radio transmitters use different radio channels, to substantially avoid mutual interference.

A radio station signal is an information signal and can be, for example, a video signal, an audio signal, a data signal, combinations thereof, or the like. The radio station signal is provided by the radio station.

The radio transmitter and the radio station are generally devices which are arranged in a stationary manner. In isolated cases, they can also be mobile, however.

In addition, it can be provided that the radio station provides a source coding and/or source modulation for the radio station signal emitted thereby, which enables substantially complete and reliable information reconstruction by the radio receiving device. The radio receiving device can be equipped with suitable source decoding and/or source demodulating units for this purpose.

In addition, it can be provided that the radio signal emitted from the radio transmitter is provided with a radio-transmitter-specific modulation and/or with a channel coding. Reliable and interference-proof transmission of the radio station signal from the radio transmitter to the radio receiving device can thus be achieved. The radio receiving device accordingly contains units suitable for this purpose, for example, a channel decoding unit and/or a demodulating unit adapted to the modulation of the radio transmitter. Modulation methods can be, for example, amplitude modulation, frequency modulation, phase modulation, quadrature amplitude modulation, combinations thereof, or further methods.

The radio receiving device acquires radio channels, in which the radio station signal of the selected radio station is transmitted by means of a separate radio channel-specific radio signal in each case. For this purpose, the entire reception range of the radio receiving device can preferably be scanned with respect to the overall available radio channels. It can be established by means of the scanning which radio channels contain a radio signal receivable by the radio receiving device. In this manner, the radio channels are acquired which firstly transmit any type of receivable radio signals at all. The received radio signals can then be analyzed with respect to radio channel-specific parameters. Radio channel-specific parameters are, for example, the selected channel coding, the selected modulation, a reception field strength, a type of reception, an identifier of the radio station, the radio station signal of which is transmitted by means of the radio signal, combinations thereof, and/or the like. In this manner, the radio receiving device can establish via which radio channels the radio station signal of the selected radio station can be received. The radio channel-specific parameters can be identical for multiple radio channels or also all radio channels.

The radio signals of the radio channels, preferably the established radio channels, which transmit the radio station signal of the selected radio station, are processed in consideration of the respective radio channel-specific parameters, for example, in that a suitable demodulation and/or decoding is performed. A corresponding radio channel-specific radio station signal is generated therefrom from each of the respective radio signals. This is preferably performed in a channel-selective manner, i.e., the processing is performed independently of the other radio channels.

The generated radio channel-specific radio station signals are then subjected to a standardization, so that they are synchronized chronologically and/or with respect to the signal amplitudes thereof. The signals standardized in this manner are then superimposed to form a reception radio station signal. The superposition can be formed, for example, by addition, maximum value formation, combinations thereof, or the like. The reception radio station signal is then output, for which purpose it is output, for example, on a corresponding playback unit, for example, a display screen, a loudspeaker, combinations thereof, or the like. In addition, of course, there is also the possibility of processing the reception radio station signal for an output in a suitable manner, for example, providing a corresponding amplification, filtering, and/or the like.

The step of acquiring radio channels preferably comprises an ascertainment of an identifier of the radio station from the radio signal and/or a specification of radio channels used by the selected radio station. It can thus be provided that the radio receiving device searches through the received radio signals with respect to the identifier of the selected radio station. The identifier can be formed, for example, by a modulation method, a source coding, an identification of the radio station, and/or the like, which are individually assigned to the respective radio station. The radio receiving device can thus select the corresponding radio channels, which are to be considered for the further processing, beforehand. The effort with respect to the step of the acquisition can thus be reduced. In addition, specifying radio channels used by the selected radio station can also be provided, in that, for example, a list having the radio channels used thereby is previously provided with respect to the selected radio station. Such a specification can preferably be provided not only for the selected radio station, but rather also for further radio stations, so that also in the event of the change of the radio station performed by a user, the method can accordingly be carried out efficiently. The step of acquisition can also be executed more efficiently, in this way.

The step of the ascertainment of radio channel-specific parameters preferably comprises the ascertainment of a modulation and/or a coding, in particular a channel coding of the respective radio signal. The radio channel-specific parameters can vary from radio transmitter to radio transmitter, so that radio channels provide a transmission of radio signals, which is provided individually according to the parameters thereof, for example. Of course, the modulation and/or the coding can also already be specified by the radio station. In particular, the radio station signal transmitted at the radio transmitter from the radio station can already contain items of information with respect to the modulation and/or the coding. In addition, the radio station signal can also already have a corresponding modulation and/or coding, so that it only has to be emitted by the radio transmitter. The modulation and/or coding of the radio signal can then be identical to that of the radio station signal. In this manner, for example, it can be ensured that all radio signals, by means of which the radio station signal is transmitted, are modulated and/or coded in the same manner. The radio receiving device can then be set to the ascertained coding and/or modulation, preferably automatically.

It can particularly advantageously be provided that the method is carried out again, in particular at specifiable points in time. It is thus possible to consider reception options which change as a result of communication properties. For example, if a communication which was not previously possible via a radio channel becomes possible as a result of a movement of the radio receiving device or the radio transmitter, this can thus additionally be taken into consideration by repeating the method. It can also be provided that a radio channel, the radio signal of which can no longer be received, is not considered further. This enables corresponding processing capacities of the radio receiving device to be used optimally, in that components which are no longer required because of a lack of reception of a corresponding radio signal are released, on the one hand, and assigned, for example, to other radio channels, in which the reception of a radio signal has become possible.

In particular, it can be provided that the step of the generation of radio channel-specific radio station signals comprises a demodulation and/or a decoding. The radio channel-specific radio station signals are generated from radio signals of the respective radio channels. In this manner, each radio channel-specific radio station signal is assigned to a reception path or a radio channel, respectively. To obtain the corresponding radio station signal from the radio signal of the respective radio channel, the radio signal is preferably demodulated and/or decoded. The decoding can be a source decoding or the like, for example.

In addition, it can be provided that during the demodulation and/or decoding of a radio signal of a radio channel, radio signals of other radio channels and/or the properties thereof are taken into consideration. It can thus be provided, for example, that a parameter which is already required for demodulation or decoding is used, which has already been used in the demodulation and/or decoding of a radio signal of another radio channel. Complex adaptations and settings and also measurements can thus be saved or optimized. Of course, properties of the radio signals of other radio channels can particularly advantageously also be taken into consideration, for example, a code sequence of a radio signal of another radio channel, for example, to find code errors, code gaps, and/or the like and to remedy these gaps, preferably before decoding takes place.

According to a further embodiment, the method can automatically be adapted to the available number of radio channels, the radio signals of which are transmitted by the radio station signal of the selected radio station. The method can be adapted rapidly and easily with respect to a selected radio station in this manner, so that more reliable radio reception is enabled by means of the radio receiving device. It can thus be provided that the user, with his selection of the selected radio station, activates a list, which is associated with the radio station, having radio channels. The method then only scans these channels with respect to suitable radio signals. Rapid adaptation or setting of the radio receiving device to the desired selected radio station can thus be achieved.

Furthermore, it can be provided that at least one radio signal is received by means of two spatially spaced-apart antennas, the antenna signals of which are processed for the radio channel-specific radio signal. This embodiment enables the radio receiving device to be equipped for diversity technology and the reception properties thus to be improved further by using diversity operation.

Furthermore, the invention proposes a radio receiving device having:
- a reception unit, which receives and outputs a radio signal transmitting a radio station signal of a selected radio station,
- an acquisition unit for radio channels, which transmit the radio station signal of the selected radio station by means of a separate radio channel-specific radio signal in each case,
- an ascertainment unit for radio channel-specific parameters of the acquired radio channels,
- a processing unit for generating radio channel-specific radio station signals by processing the radio signals of the radio channels in consideration of the respective radio channel-specific parameters,
- a standardization unit for generating radio channel-specific radio station signals,
- a superposition unit for superimposing the standardized radio channel-specific radio station signals to form a reception radio station signal, and
- an output unit for the reception radio station signal.

In this manner, the radio receiving device is configured for carrying out the method according to the invention. This radio receiving device therefore enables the achievement of the advantages already mentioned with the method.

One advantageous embodiment provides that the radio receiving device has an identifier unit for ascertaining an identifier of the radio station from the radio signal and/or a specification of radio channels used by the selected radio station. The identifier unit enables an identifier to be ascertained in a radio signal. This identifier is preferably individually assigned to the radio station, that is to say, the radio station has an individualizing identification in this case. The identifier can be provided, for example, by a special processing method of the radio station signal, but also by repeatedly incorporating a code which represents the identifier. In addition, it can also be provided that radio channels used by the selected radio station are specified, so that an associated radio station can be assigned solely by the selection of a radio channel.

One refinement provides that the radio receiving device has a selection unit for selecting a radio station. The selection unit can be, for example, a program selection unit, an input unit, by means of which a user can input a title and/or an identifier of a radio station, a speech input unit, by means of which the user can input the name of the radio station which he wishes to select, and/or the like. The selection unit can be manually operable, for example.

One refinement provides that the radio receiving device has at least two antenna terminals, the signals of which are processed by the reception unit according to the principle of diversity technology. This enables the reception properties to be improved with respect to a radio channel with usage of diversity technology.

Further features and advantages can be inferred from the following description of exemplary embodiments. Identical features and functions are identified with identical reference signs in the exemplary embodiments. The exemplary embodiments are only used for further explanation of the invention and are not to restrict it.

Figure 2:
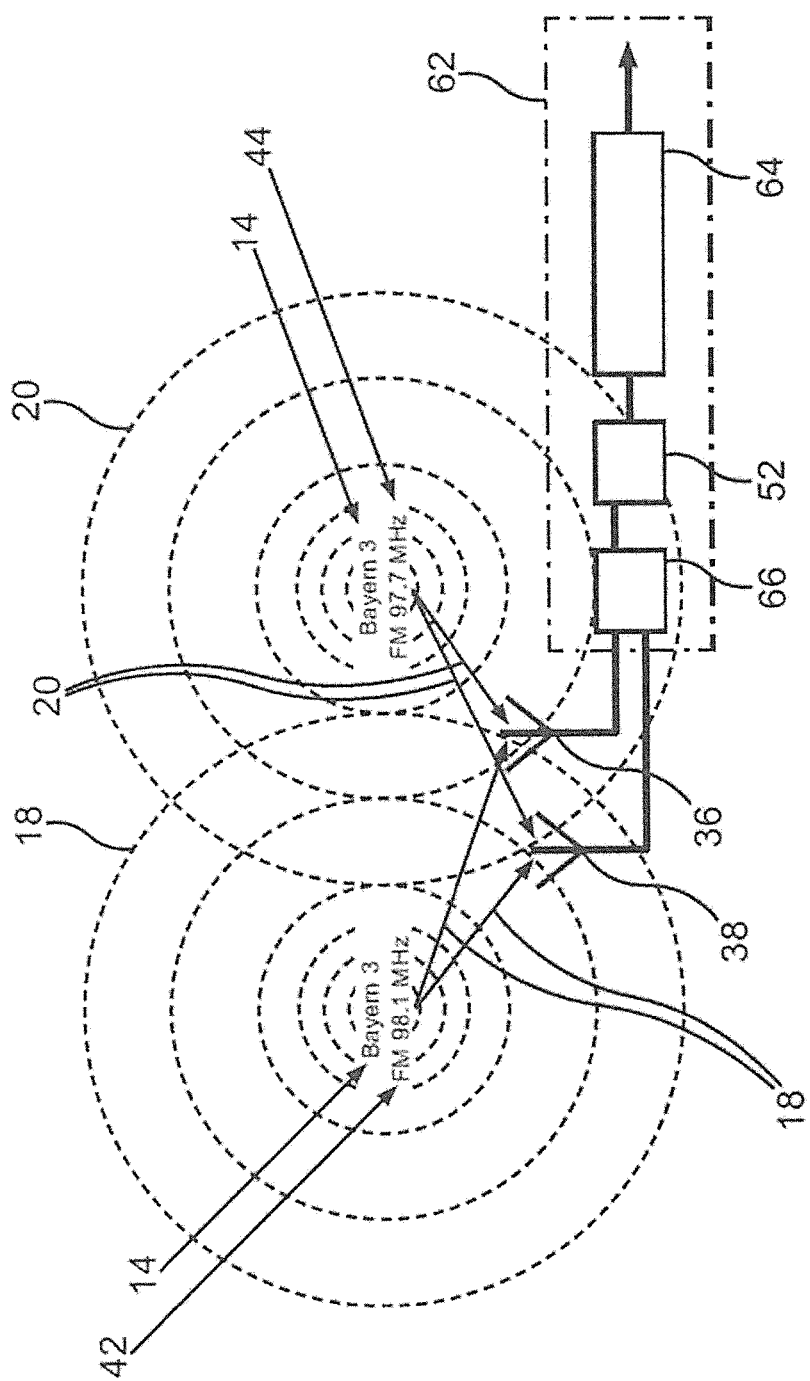
Figure 3:
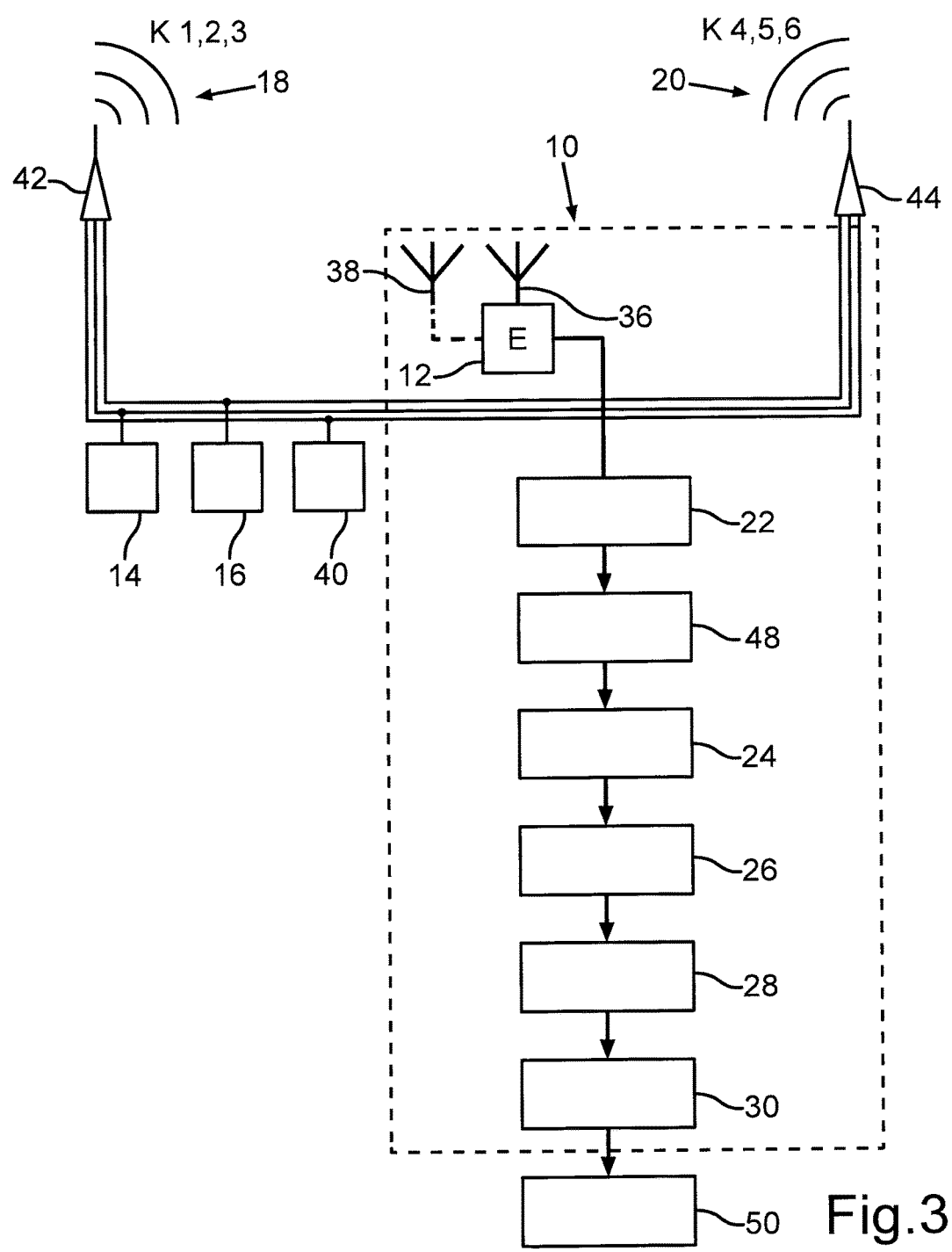
Figure 4:
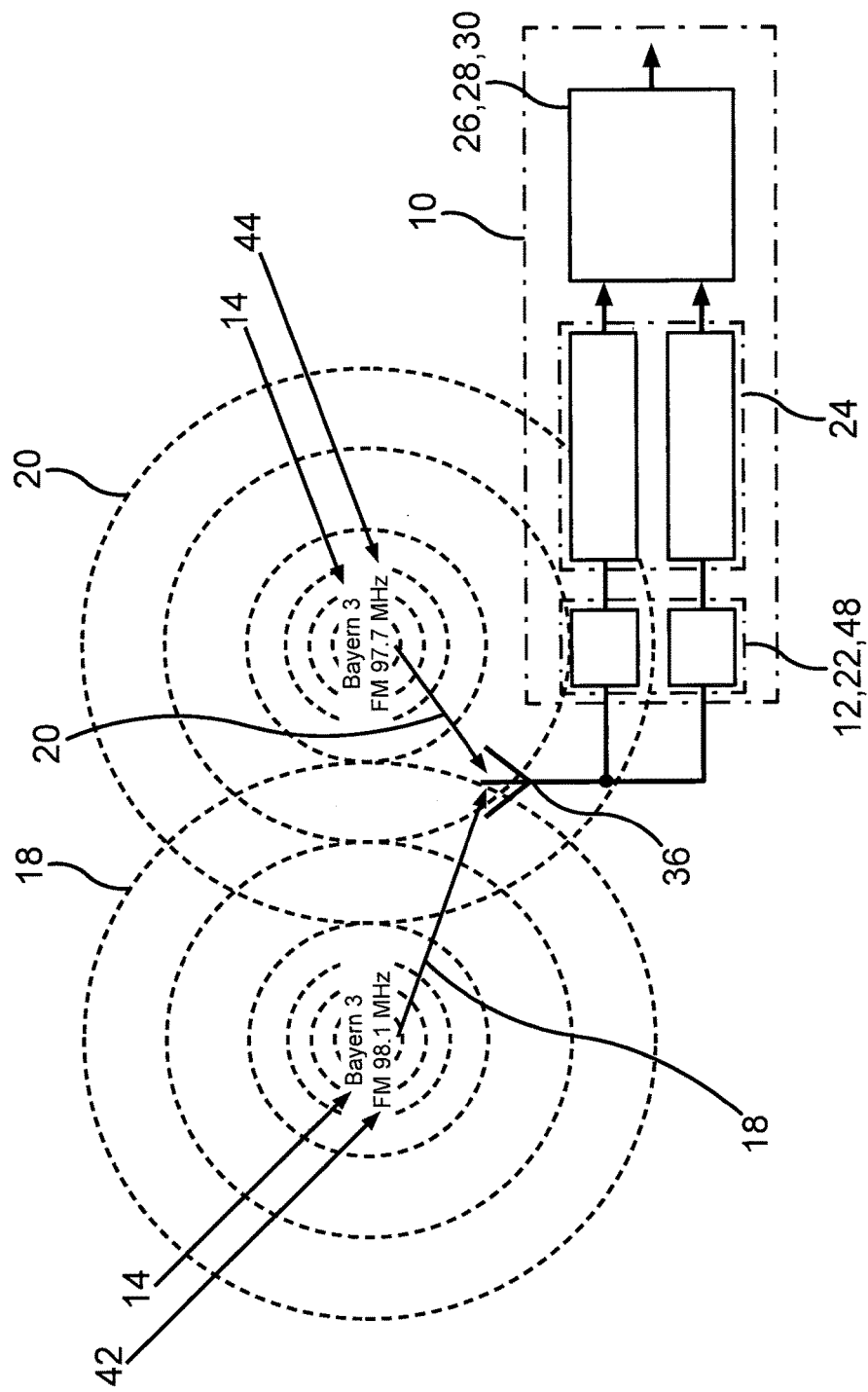
Figure 5:
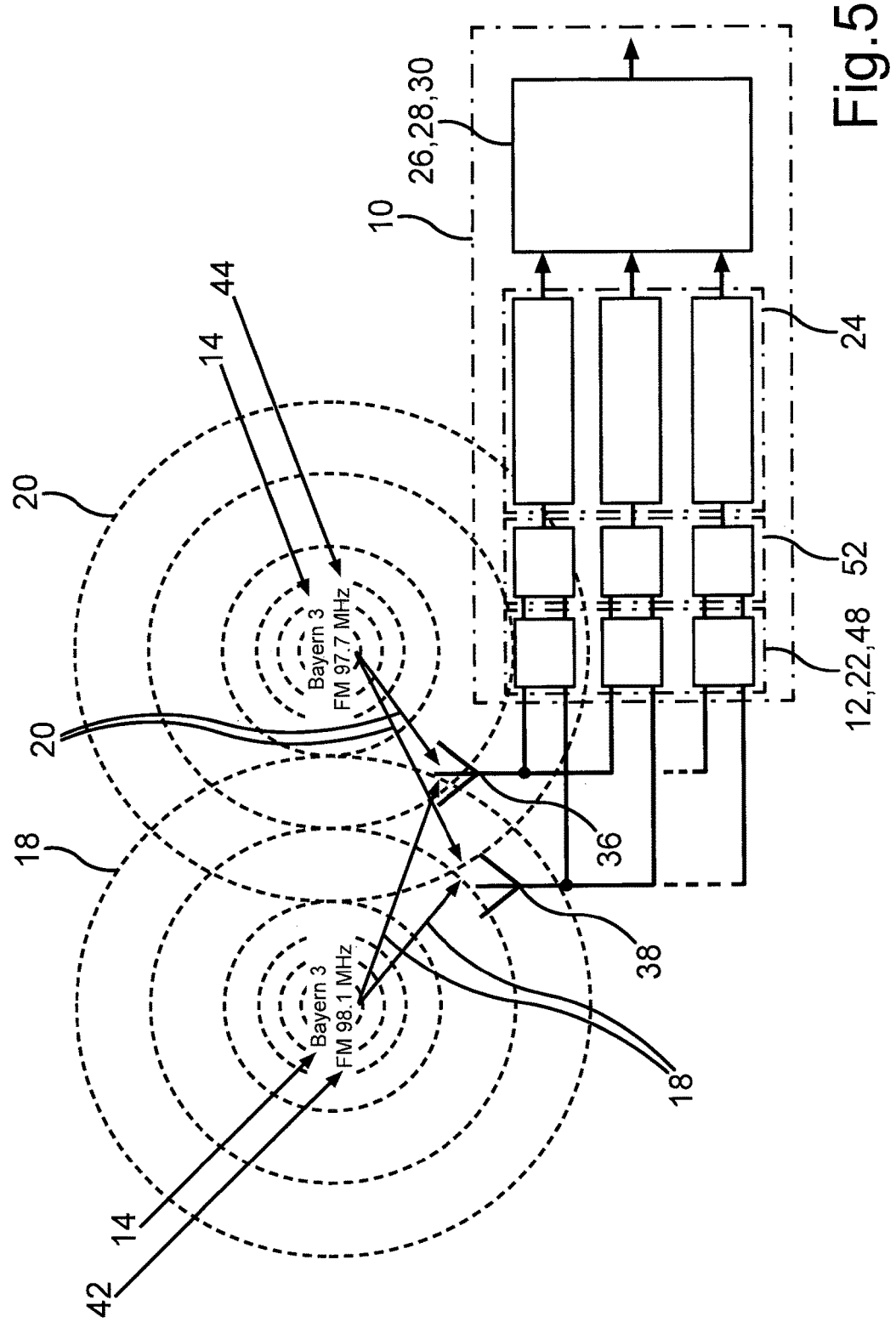
Figure 6:
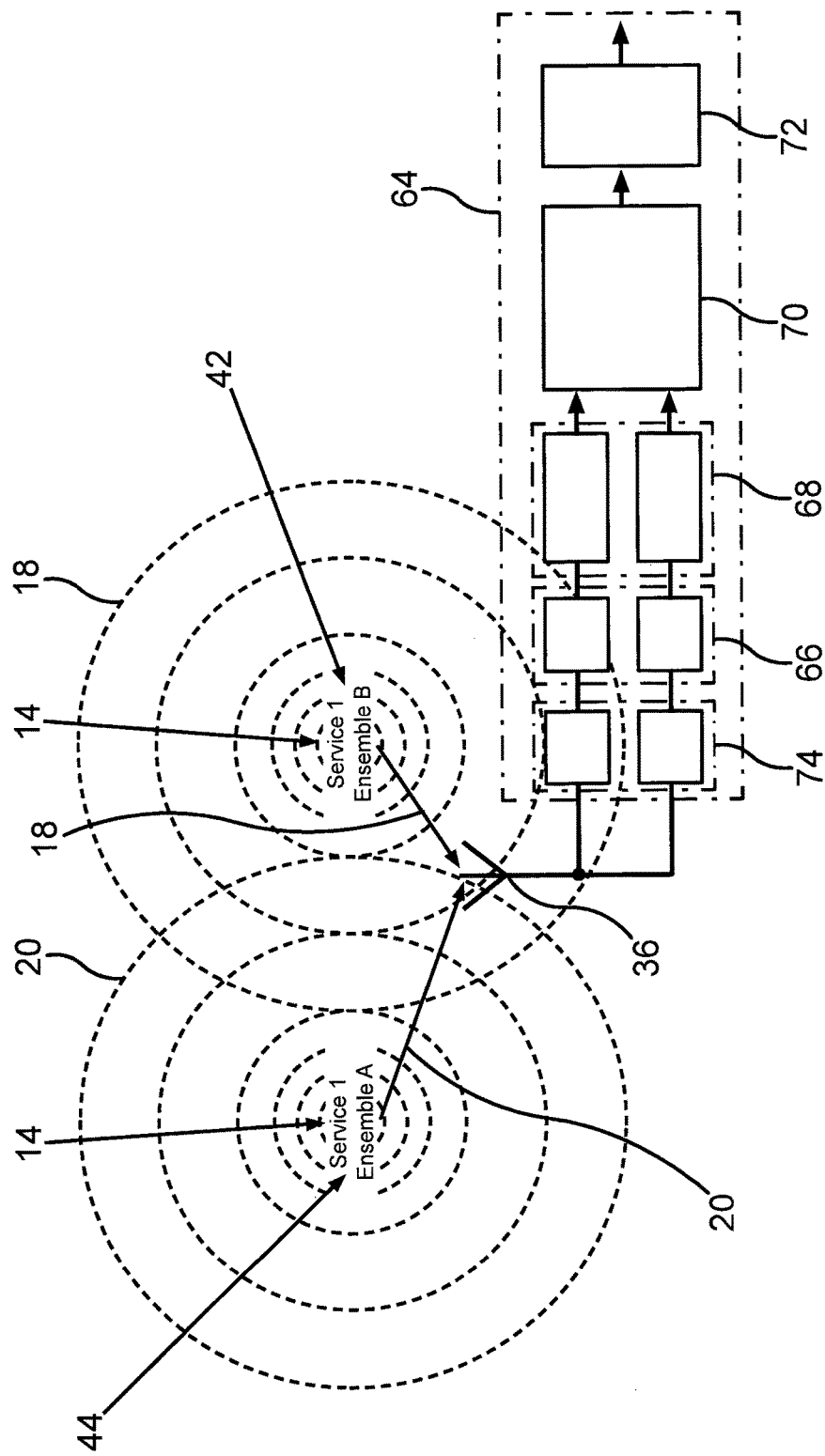

In the figures:

FIG. 1 shows a schematic illustration of a radio transmission system of the type in question for the VHF range having a radio receiving device according to the related art, FIG. 2 shows a schematic illustration of a radio transmission system having a radio receiving device as in FIG. 1, to which two antennas are connected and which enables processing of the antenna signals according to diversity technology, FIG. 3 shows a schematic illustration of a radio system having a radio receiving device, which is configured according to the invention, in a first embodiment, FIG. 4 shows a schematic illustration of a radio system having a radio receiving device according to the invention according to a second embodiment, FIG. 5 shows a schematic illustration of a radio system having a radio receiving device according to the invention according to a third embodiment, and FIG. 6 shows a schematic illustration of a radio system having a radio receiving device according to the invention according to a fourth embodiment.

FIG. 1 shows a schematic view of a radio system having two radio transmitters 42, 44, which each emit a radio station signal of a radio station 14 by means of radio signals 18, 20 in a unidirectional manner. The radio station 14 is the radio station "Bavaria 3" here, for example. The radio signals use electromagnetic waves in the VHF range as a medium. Each radio signal 18, 20 uses a separate radio channel, so that the radio signals 18, 20 cannot mutually interfere. Accordingly, different radio channels are assigned to adjacent radio transmitters 42, 44, so that mutual interference can be substantially avoided in an overlap range.

FIG. 1 furthermore shows a radio receiving device 60, which is connected to an antenna 36. The signals supplied by the antenna 36 are firstly processed by means of a selection receiver 56, which also performs a selection of a selected radio channel at the same time here. The selection of the radio channel is performed by the user by means of a manual user input, for example. The signal provided by the selection receiver 56 is supplied to an FM demodulator 58, which carries out an FM demodulation and provides the demodulated signal as an output signal. This signal can be fed to a separate output unit (not shown) or also to an external interface for further purposes. In the present case, an audio signal is provided, which is fed to an amplifier (not shown) which amplifies the signal in accordance with a user setting and is rendered acoustically by means of an acoustic playback device, in particular a loudspeaker. In the present usage range of the electromagnetic waves, namely the VHF range, the radio signals 18, 20 are generally frequency modulated (FM). The FM modulation is typically provided on the part of the radio transmitters 42, 44. The radio station signal, namely the actual information signal of the radio station 14, is generally first FM modulated by means of the radio transmitters 42, 44.

FIG. 2 shows a further embodiment of a radio system, which is constructed on the side of the radio station and on the side of the radio transmitter as in FIG. 1. In this regard, reference is therefore made on the statements on FIG. 1.

In contrast to the embodiment according to FIG. 1, the exemplary embodiment according to FIG. 2 has a radio receiving device 62, to which two antennas 36, 38 are connected. The antennas 36, 38 are arranged spaced apart from one another and receive the respective radio signal 18, 20 of the respective radio transmitter 42, 44 as a result thereof with a time difference and/or a phase difference. The radio receiving device 62 has a selection receiver 66, which processes the signals of the antennas 36, 38 in accordance with a user-selected radio station 14. The selection receiver 66 provides two signals, which correspond to the respective antenna signals of the antennas 36, 38, for further processing by a diversity unit 52. The diversity unit 52 processes the two signals of the selection receiver 66 according to diversity technology and generates a signal which is provided to an FM demodulator 64. This carries out an FM demodulation and provides—as in the exemplary embodiment according to FIG. 1—a signal for an output unit (not shown) or for output via an interface. Improved reception can be achieved with the usage of diversity technology, in particular if the signals supplied by the antennas 36, 38 are different from one another with respect to the reception quality. Good radio reception can still be achieved by means of the radio receiving device 62 by way of diversity technology even with significantly deviating qualities of the reception signals of the antennas 36, 38.

FIG. 3 shows a schematic illustration of a radio system having a radio receiving device 10 according to the invention. The radio system comprises—like the radio systems of FIGS. 1 and 2—two radio transmitters 42, 44, wherein radio signals 18 with respect to the radio channels K1, K2, K3 are assigned to the radio transmitter 42 and radio signals 20 with respect to the radio channels K4, K5, and K6 are assigned to the radio transmitter 44. The radio signals 18, 20 use—as in the radio systems of FIGS. 1 and 2—electromagnetic waves as the transmission medium. The radio channels K1 to K6 are defined by different frequency ranges, so that radio signals 18 and radio signals 20 are prevented from being able to mutually interfere. For this purpose, the radio channels K1 to K6 have a corresponding bandwidth. The radio transmitters 42, 44 are connected to radio stations 14, 16, 40, which transmit the radio station signals thereof, for example, via wires or also via directional radio, satellite, and/or the like, to the radio transmitters 42, 44. The radio transmitters permanently assign the radio station signals to radio channels K1 to K6.

It is provided in the present case that the radio station signal of the radio station 14 is emitted from the radio transmitter 42 via the radio channel K1, while in contrast it is emitted from the radio transmitter 44 via the radio channel K4. Accordingly, the radio station signal of the radio station 16 is assigned to the radio channel K2 of the radio transmitter 42 and the radio channel K5 of the radio transmitter 44. The radio station signal of the radio station 40 is assigned to the radio channel K3 of the radio transmitter 42 and the radio channel K6 of the radio transmitter 44. This assignment is permanently specified in the present case. However, under specific conditions, the assignment of radio channels to radio station signals can also vary. Of course, a radio transmitter 42, 44 can also emit a radio station signal via more than one radio channel.

The radio signals 18, 20 emitted from the radio transmitters 42, 44 are received by means of a radio receiving device 10 according to the invention. For this purpose, the radio receiving device 10 is connected to an antenna 36. If the radio receiving device 10 uses diversity technology, it can additionally be connected to a second antenna 38, which is spatially spaced-apart. The corresponding required modifications result from the description of FIG. 2 and are correspondingly applicable.

For the purposes of radio reception, the antenna 36 or optionally also the antenna 38 is/are connected to a reception unit 12 of the radio receiving device 10. The reception unit 12 supplies a signal to an acquisition unit 22 of the radio receiving device 10, which transmits the radio station signal of the radio station 40 selected by the user by means of a separate radio channel-specific radio signal 18, 20 in each case. For this purpose, it can be provided that the signal supplied by the reception unit 12 is studied and selected with respect to an identifier of the corresponding radio station. Only the selected signals are relayed from the acquisition unit 22 to an ascertainment unit 48 for radio channel-specific parameters of the acquired radio channels K1 to K6. The ascertainment unit 48 supplies the signals selected in accordance with the selection and the radio channel-specific parameters of the acquired radio signals to a processing unit 24, which essentially performs a suitable channel-selective demodulation and/or decoding in the present case.

In the present case, the user has selected the radio station 14, so that the signals of the radio channels K1 and K4 are accordingly demodulated and/or decoded. The radio channel-specific radio station signals generated in this case are supplied to a standardization unit 26, which carries out a standardization in particular with respect to a time offset and/or an amplitude. At the same time, it can be provided that the standardization unit 26 provides a signal, which has interference, with a corresponding information value or also sets it to zero. For the purposes of standardization, it can be provided that the standardization unit 26 carries out a correlation of the two radio channel-specific radio station signals. On the basis of the correlation, for example, the time offset of the signals in relation to one another can be tared, in that corresponding delay lines are activated suitably.

The standardization unit 26 supplies the radio channel-specific radio station signals standardized thereby to a superposition unit 28, which superimposes these signals. For example, it can be provided that the superposition unit 28 merely adds the signals. However, it can also be provided that if one of the signals has a zero value or is identified as having interference, only the other superimposed signal or signals is/are supplied as the output signal. The superposition unit 28 therefore supplies a single output signal, which essentially corresponds to the radio station signal emitted from the radio station 14. The radio station signal supplied by the superposition unit 28 is then fed to an output unit 30, which outputs the signal, for example, via an interface for further use. The output unit 30 can also relay the signal to an amplifier (not shown in greater detail) having an acoustic playback unit such as a loudspeaker. Of course, the acoustic playback can also be integrated in the output unit 30. The output unit 30 can be connected for this purpose to a playback device 50, which has, in addition to an amplifier, which is preferably settable by the user, one or more loudspeakers for acoustic playback.

FIG. 4 shows a more specific form of an exemplary embodiment based on the exemplary embodiment described for FIG. 3. It is apparent from FIG. 4 that for each of the two reception channels, a separate branch is provided having a reception unit 12, an acquisition unit 22, and an ascertainment unit 48. Accordingly, these branches supply independent output signals to one processing unit 24 in each case, which performs a corresponding FM demodulation for each branch. The two FM-demodulated signals are then fed to a block made of a standardization unit 26, a superposition unit 28, and an output unit 30, so that a single signal is output from the output unit 30. This signal is available for further processing, as explained above.

The exemplary embodiment according to FIG. 5 shows two expansions in relation to the exemplary embodiment according to FIG. 4, because of which only these two expansions are explained in greater detail hereafter. The remaining substantive matters correspond to the statements according to the embodiments of FIGS. 3 and 4.

In a first difference from the embodiment according to FIG. 4, processing according to diversity technology is provided. For this purpose, the radio receiving device 10 is connected to two antennas 36, 38, which are both connected at the same time to a block having channel-specific branches for a reception unit 12, an acquisition unit 22, and an ascertainment unit 48. The two signals, which are each antenna-specific, supplied from these units are fed to a block of a diversity unit 52, which carries out further channel-specific processing of the respective channel-specific signals according to diversity technology. A separate diversity unit is accordingly provided for each branch. The diversity unit 52 supplies a channel-specific signal for each branch to a processing unit 24 provided for each branch, which carries out an FM demodulation. The FM-demodulated signals arising in each branch are then guided to a block, which has a standardization unit 26, a superposition unit 28, and an output unit 30. The output unit 30 again supplies the output signal, which substantially corresponds to the radio station signal of the selected radio station 14. It is processed further as explained above.

FIG. 5 shows an exemplary arrangement of a third branch, which is also connectable to the antennas 36, 38 as shown by a dashed line. This third branch can be set to a radio signal of a further radio channel of the selected radio station 14. The reliability of the reception can thus be increased further.

The number of the branches according to FIG. 5 can be varied in accordance with the available radio-station-related radio channels.

It can be checked at regular intervals whether further radio channels are receivable and a corresponding branch can then be set to the respective supplementary radio channels. For example, if the user selects a different radio station, an assignment of the respective branches of the radio receiving device 10 can thus be performed again.

In addition, it can be provided in a further exemplary embodiment that the user specifies two or more preferred radio stations, for which the radio receiving device 10 automatically performs a channel assignment. This has the advantage that the user can switch over between the radio stations preferred by him automatically, without a playback of the radio station signal resulting in time delays as a result of settings in the radio receiving device 10. Overall, this permits the invention to enable reliable reception of a selected radio station signal.

FIG. 6 shows a radio receiving device 64, which is designed as a digital audio broadcasting (DAB) radio receiving device. The basic structure corresponds to the exemplary embodiment according to FIG. 4, because of which reference is additionally made to these statements. If the exemplary embodiment of FIG. 4 was directed to analog signal transmission, the signal transmission is of a digital nature in this exemplary embodiment.

This embodiment shows that the invention can be transferred similarly to digital broadcast, in particular digital sound broadcasting or digital radio. The DAB radio receiving device 64 is connected to an antenna 36, which receives corresponding radio signals 18, 20, which are determined here by digital signals. The radio transmitters 42, 44 accordingly emit digital radio signals. They are received by means of the antenna 36. Corresponding reception signals of the antenna 36 are fed to the DAB radio receiving device 64.

In accordance with the number of the radio channels—two radio channels are used in FIG. 6—the DAB radio receiving device 64 has two branches, which are assigned to the respective radio channels 18, 20, for signal processing. The signals supplied from the antenna 36 are firstly fed to a selection unit 74, which carries out a corresponding channel selection with respect to the selected radio station 14, 16, 40. The channel-specific radio signals are then fed to a baseband unit 68, which carries out a corresponding signal transformation into the baseband. This transformation also takes place in a radio channel-specific manner for each channel-specific radio signal. These signals are thereupon fed to a service selection unit 68, by means of which the signals of the selected radio station are selected. The signals obtained in this way are fed to a processing unit 70, which performs an error correction of the digital signals and performs a time adaptation, for example, by means of a settable time delay. For this purpose, a correlation of the signals can be provided, to ascertain the optimum timeshift. Subsequently, the signals are synthesized and superimposed to form a common radio station reception signal, which is fed to a signal decoder 72. The desired radio station signal is available for further purposes at the output of the signal decoder 72.

The above-mentioned exemplary embodiments are only used to explain the invention and are not to restrict it. In particular, of course, features and exemplary embodiments can be combined with one another as desired, to arrive at further embodiments, which meet the demands, without leaving the concept of the invention.

The advantages and features and also the embodiments described for the method according to the invention apply similarly to the device according to the invention and a vehicle equipped with the device.

The features and combinations of features mentioned in the description and/or features and combinations of features which are shown separately in the figures are usable not only in the respective specified combination, but rather also in other combinations or alone, without leaving the scope of the invention.

The invention claimed is:

1. A method for operating a radio receiving device, which receives and outputs a radio signal, which transmits a radio station signal of a selected radio station in the scope of an analog signal transmission, wherein the method comprises:
   acquiring radio channels, which transmit the radio station signal of the selected radio station using a separate radio channel-specific radio signal in each case,
   ascertaining radio channel-specific parameters of the acquired radio channels, wherein ascertaining radio channel-specific parameters comprises the ascertainment of a modulation of the respective radio signal, and specifically a modulation method, namely amplitude modulation, frequency modulation, or phase modulation,
   automatically setting a demodulation unit of the radio receiving device to the ascertained modulation,
   generating radio channel-specific radio station signals by processing the radio signals of the radio channels in consideration of the respective radio channel-specific parameters, wherein the step of the generation of radio channel-specific radio station signals comprises a demodulation, standardizing the generated radio channel-specific radio station signals wherein standardizing the generated radio channel-specific radio station signals comprises a synchronization between radio channel-specific radio station signals with respect to a time offset and an amplitude, superimposing the standardized radio channel-specific radio station signals by addition to form a reception radio station signal, and outputting the reception radio station signal.

2. The method as claimed in claim 1,
characterized in that the step of acquiring radio channels comprises an ascertainment of an identifier of the radio station from the radio signal and/or a specification of radio channels used by the selected radio station.

3. The method as claimed in claim 1, characterized in that the method is carried out again, in particular at specified points in time.

4. The method as claimed in claim 1,
characterized in that, during the demodulation and/or decoding of a radio signal of a radio channel, radio signals of other radio channels and/or the properties thereof are taken into consideration.

5. The method as claimed in claim 1,
characterized in that the method is automatically adapted to the available number of radio channels, the radio signals of which the radio station signal of the selected radio station transmit.

6. The method as claimed in claim 1,
characterized in that at least one radio signal is received by means of two spatially spaced-apart antennas, the antenna signals of which are processed to form the radio channel-specific radio signal.

* * * * *